US012786950B2

(12) United States Patent
Hong

(10) Patent No.: US 12,786,950 B2
(45) Date of Patent: Nov. 3, 2026

(54) PAGING MESSAGE PROCESSING METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 419 days.

(21) Appl. No.: 18/005,314

(22) PCT Filed: Aug. 26, 2020

(86) PCT No.: PCT/CN2020/111530

§ 371 (c)(1),
(2) Date: Jan. 12, 2023

(87) PCT Pub. No.: WO2022/041016

PCT Pub. Date: Mar. 3, 2022

(65) Prior Publication Data

US 2023/0269701 A1 Aug. 24, 2023

(51) Int. Cl.
*H04W 68/00* (2009.01)

(52) U.S. Cl.
CPC ................................. *H04W 68/005* (2013.01)

(58) Field of Classification Search
None
See application file for complete search history.

(56) References Cited

U.S. PATENT DOCUMENTS 11,057,865 B1 * 7/2021 Wong .................. H04W 68/005

FOREIGN PATENT DOCUMENTS

CN 110214462 A 9/2019
WO WO-2020106611 A1 * 5/2020 ........ H04W 52/0209

OTHER PUBLICATIONS

International Search Report and Written Opinion of International Application No. PCT/CN2020/111530, mailed May 26, 2021, 13 pages.

* cited by examiner

*Primary Examiner* — Gary Lafontant
(74) *Attorney, Agent, or Firm* — Finnegan, Henderson, Farabow, Garrett & Dunner, L.L.P.

(57) ABSTRACT

A method for processing a paging message is performed by a base station, and includes: sending a paging message carrying a paging cause, wherein the paging cause is provided for a user equipment (UE) to determine to respond to or ignore the paging message.

13 Claims, 6 Drawing Sheets

PAGING MESSAGE PROCESSING METHOD AND APPARATUS, AND COMMUNICATION DEVICE AND STORAGE MEDIUM

CROSS-REFERENCE TO RELATED APPLICATIONS

The present application is a U.S. national stage application of International Application No. PCT/CN2020/111530, filed on Aug. 26, 2020, the contents of both of which are incorporated herein by reference in their entireties.

TECHNICAL FIELD

The present disclosure relates to, but is not limited to, the technical field of wireless communication, and in particular to a method for processing a paging message, an apparatus for processing a paging message, a communication device and a storage medium.

BACKGROUND

With the development of wireless communication technology, dual-card or even multi-card mobile phones are widely used. Processing methods for the multi-card mobile phones include various modes such as dual-card single standby, dual-card dual-standby single-pass, and dual-card dual-standby dual-pass. In practical applications, a terminal uses one of the subscriber identification cards for network data interaction. That is, terminal hardware and software systems of the system in this one card are used for communication, and the other card may be in the listening state. That is, it should listen to paging message(s) and system message(s) of the other card at set intervals to realize the services of the two cards. However, listening to another card will reduce the performance of the network data interaction of the current subscriber identification card. If not listening, another subscriber identification card may not be used, thus reducing the user experience.

SUMMARY

According to a first aspect of embodiments of the present disclosure, a method for processing a paging message is provided. The method for processing the paging message is performed by a base station and includes sending a paging message carrying a paging cause. The paging cause is provided for a user equipment (UE) to determine to respond to or ignore the paging message.

According to a second aspect of embodiments of the present disclosure, a method for processing a paging message is provided. The method for processing the paging message is performed by a user equipment (UE) and includes receive a paging message; and responding to or ignoring the paging message according to a paging cause carried in the paging message.

According to a third aspect of embodiments of the present disclosure, a method for processing a paging message is provided. The method for processing a paging message is performed by a core network device and includes sending predetermined information for determining a paging cause for paging a UE. The paging cause is carried in a paging message and configured to allow the UE to determine to respond to or ignore the paging message.

According to a fourth aspect of embodiments of the present disclosure, a communication device is provided. The communication device at least includes a processor; and a memory for storing instructions executable by the processor. The processor is configured to perform the above method for processing the paging message when executing the instructions.

According to a fifth aspect of embodiments of the present disclosure, a non-transitory computer-readable storage medium is provided. The non-transitory computer-readable storage medium has stored therein computer executable instructions that, when executed by a processor, cause the processor to perform the above method for processing the paging message.

BRIEF DESCRIPTION OF THE DRAWINGS

The accompanying drawings, which are incorporated in and constitute a part of this specification, illustrate embodiments consistent with the present disclosure and, together with the description, serve to explain the principles of embodiments of the present disclosure.

DETAILED DESCRIPTION

Reference will now be made in detail to illustrative embodiments, examples of which are illustrated in the accompanying drawings. The following description refers to the accompanying drawings in which the same numbers in different drawings represent the same or similar elements unless otherwise represented. The implementations set forth in the following description of illustrative embodiments do not represent all implementations consistent with the disclosure. Instead, they are merely examples of apparatuses and methods consistent with aspects related to embodiments of the disclosure as recited in the appended claims.

Terms used in embodiments of the present disclosure are for describing some embodiments only, and are not intended to limit the embodiments of the present disclosure. As used in embodiments of the present disclosure and the appended claims. "a/an", and "the" in singular forms are also intended to include plural forms unless the context clearly indicates otherwise. It could also be understood that the term "and/or" as used herein refers to and includes any and all possible combinations of one or more associated listed items.

It could be understood that although the embodiments of the present disclosure may use the terms "first", "second", "third", etc. to describe various information, but the information is not limited to these terms. These terms are only used to distinguish information of the same type from each other. For example, without departing from the scope of embodiments of the present disclosure, first information may also be called second information, and similarly second information may also be called first information. Depending on the context, the word "if" as used herein may be interpreted as "upon" or "when" or "in response to determining".

Figure 1:
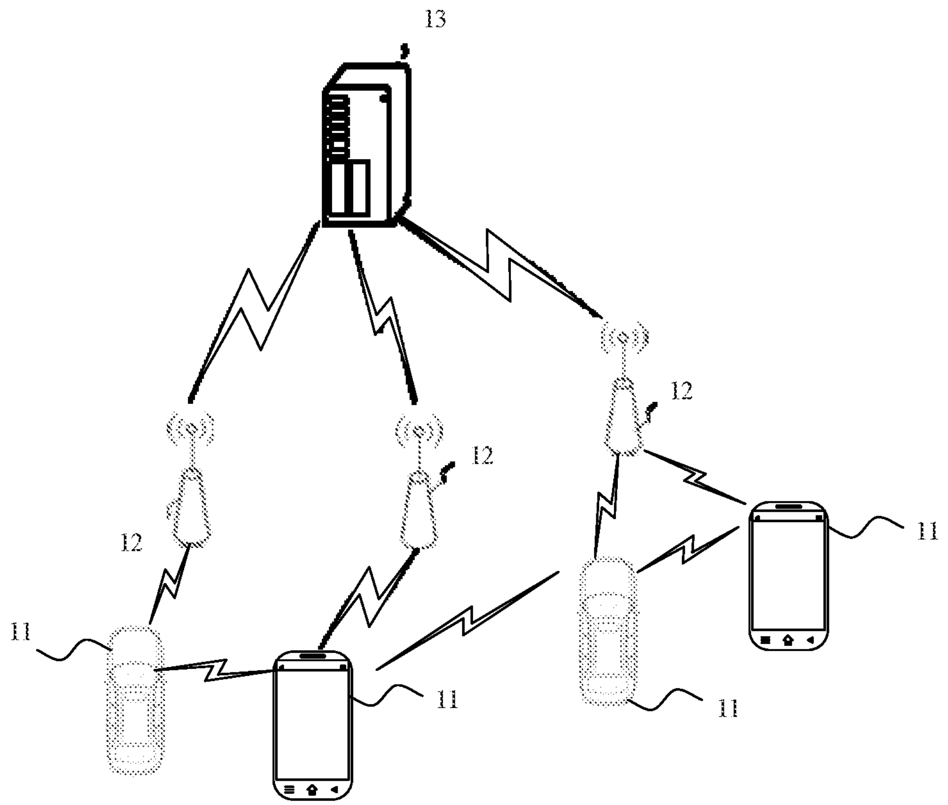
FIG. 1 is a schematic diagram illustrating a wireless communication system according to an embodiment.

FIG. 1 is a schematic diagram illustrating a wireless communication system according to an embodiment of the present disclosure. As shown in FIG. 1, the wireless communication system is a communication system based on the cellular mobile communication technology, and the wireless communication system may include a plurality of terminals 11 and a plurality of base stations 12.

The terminal 11 may be a device that provides voice and/or data connectivity to a user. The terminal 11 may communicate with one or more core networks via a radio access network (RAN). The terminal 11 may be an Internet of Things terminal, such as a sensor device, a mobile phone (or called a "cellular" phone) and a computer having an Internet of Things terminal. For example, the terminal 11 may be a fixed, portable, pocket, hand-held, built-in computer or vehicle-mounted device. For example, the terminal 11 may be a station (STA), a subscriber unit, a subscriber station, a mobile station, a mobile, a remote station, an access point, a remote terminal, an access terminal, a user terminal, a user agent, a user device, or a user equipment (UE). Alternatively, the terminal 11 may be a device of an unmanned aerial vehicle. Alternatively, the terminal 11 may be a vehicle-mounted device, for example, a trip computer with a wireless communication function, or a wireless communication device externally connected to the trip computer. Alternatively, the terminal 11 may be a roadside device, for example, it may be a street lamp, a signal lamp, or other roadside devices with a wireless communication function.

The base station 12 may be a network side device in a wireless communication system. The wireless communication system may be the fourth generation mobile communication technology (4G) system, also known as a long term evolution (LTE) system. Alternatively, the wireless communication system may be the fifth generation mobile communication technology (5G) system, also called a new radio (NR) system or 5G NR system. Alternatively, the wireless communication system may be a next generation system of the 5G system. An access network in the 5G system may be called a new generation-radio access network (NG-RAN).

The base station 12 may be an evolved base station (eNB) adopted in a 4G system. Alternatively, the base station 12 may be a central distributed architecture base station (gNB) in the 5G system. When the base station 12 adopts a central distributed architecture, the base station 12 generally includes a central unit (CU) and at least two distributed units (DU). The central unit is provided with a protocol stack of a packet data convergence protocol (PDCP) layer, a radio link control (RLC) layer, or a media access control (MAC) layer. A protocol stack of a physical (PHY) layer is provided in the distributed unit. The specific implementation manner of the base station 12 is not be limited in embodiments of the present disclosure.

A wireless connection may be established between the base station 12 and the terminal 11 through a wireless air interface. In some embodiments, the wireless air interface is a wireless air interface based on the fourth generation mobile communication network technology (4G) standard. Alternatively, the wireless air interface is a wireless air interface based on the fifth generation mobile communication network technology (5G) standard. For example, the wireless air interface is a new radio. Alternatively, the wireless air interface may be a wireless air interface based on a next generation mobile communication network technology standard based on 5G.

In some embodiments, an E2E (end to end) communication may be established between terminals 11, for example, a vehicle to everything (V2X) communication, such as a V2V (vehicle to vehicle) communication, a V2I (vehicle to infrastructure) communication and a V2P (vehicle to pedestrian) communication.

In some embodiments, the above-mentioned wireless communication system may further include a network management device 13.

The base stations 12 are connected to the network management device 13. The network management device 13 may be a core network device in the wireless communication system. For example, the network management device 13 may be a mobility management entity (MME) in an evolved packet core network (EPC). Alternatively, the network management device may be other core network devices, such as a serving gate way (SGW), a public data network gateway (PGW), policy and charging rules function unit (PCRF) or a home subscriber server (HSS). The implementation form of the network management device 13 is not limited in embodiments of the present disclosure.

Figure 2:
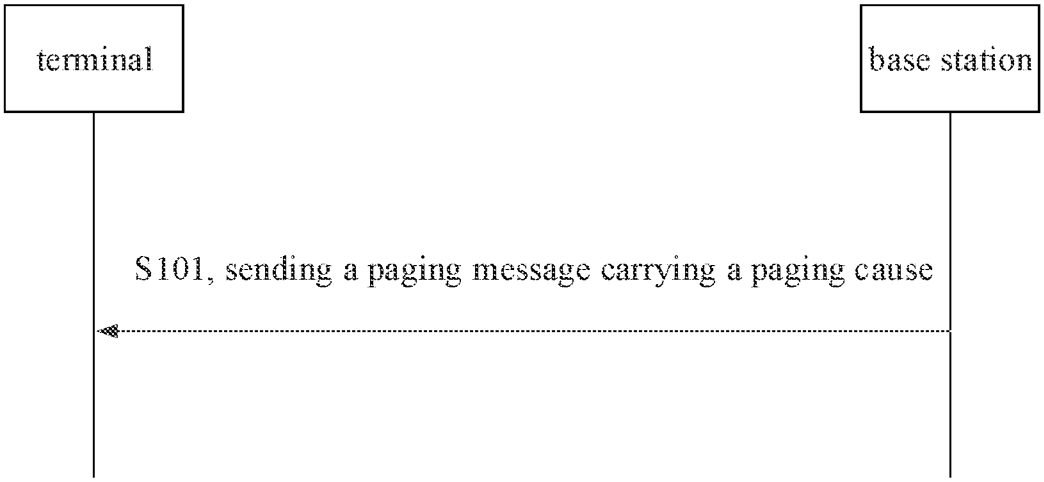
FIG. 2 is a flow chart illustrating a method for processing a paging message according to an embodiment.

As shown in FIG. 2, the present disclosure provides a method for processing a paging message. The method is performed by a base station and includes operation in block S101.

In block S101, a paging message carrying a paging cause is sent. The paging cause is provided for a user equipment (UE) to determine to respond to or ignore the paging message.

In the embodiments of the present disclosure, when the base station sends the paging message to the UE, the base station may determine the paging cause based on a service type corresponding to the paging message, and carry the paging cause in the paging message to notify, the UE. Here, in the paging message carrying the paging cause, an identifier or an information element carrying a predetermined paging cause may be carried by the paging message at a designated position, or contents of the paging cause may be directly carried at the designated position of the paging message. An implicit manner may also be possible, for example, the content at the specified position in the paging message may indicate a paging type of the paging message to the UE.

In this way, after the UE receives the paging message, the UE may determine whether to respond to the paging message or not according to the paging cause.

In embodiments of the present disclosure, the paging cause may be related to the service type corresponding to the paging message. For example, for a paging message corresponding to a call service, the paging cause is an incoming call. For a paging message corresponding to a short message service, the paging cause is a request to receive a short message. For a system message and an emergency notification service message, the paging cause may be an emergency notification.

The user equipment for receiving the paging message may be a user equipment in any state, such as, a UE in a RRC connected state, a UE in a RRC inactive state, and a UE in a RRC idle state.

The core network sends a paging message carrying system information changes or earthquake and tsunami notifications. The paging messages may be directed to the UEs in any state, such as the UEs in the RRC connected state, the UEs in the RRC inactive state, and the UEs in the RRC idle state.

For example, according to service transmission requirements, the paging message sent by the core network and configured to trigger the UE to switch from the RRC idle state to the RRC connected state to transmit data is a paging message based on the service.

For another example, the UE is in the RRC inactive state, and an accesses network sends the paging message based on a RAN notification area.

In a case where the terminal has two or more user identification cards, a user identification card paged receives a paging message carrying a paging cause, the terminal may determine whether to respond to the paging message according to the paging cause. If no response is required, there is no need to switch the user identification card to the RRC connection state, so that the terminal may keep the state corresponding to each user identification card without switching to other states. Therefore, an interference (caused by switching the user identification card from being in the inactive state to the RRC connection state) to the user identification card currently being in the RRC connection state is reduced, and the performance of the network interaction is improved.

If it is determined that the paging message needs to be responded to according to the paging cause, the user identification card in the inactive state may be switched to the RRC connection state to quickly resume the data transmission, thus ensuring the normal data interaction of the service application of this user identification card.

In this way, the base station notifies the paging cause when the base station sends downwards the paging message. On one hand, the terminal may keep listening to the paging message for each user identification card, and avoid missing service messages (the missing may be caused by failing to listen to the message since the user identification card is in the inactive state or the idle state). On the other hand, the terminal may specifically and pointedly respond to the paging message according to the paging cause, and reduce system resources occupied by unnecessary responses of the user identification card which is in the inactive state or the idle state, thus providing data reference for improving the overall performance of the terminal.

In some embodiments, the paging cause is carried in a paging cause IE of the paging message or an assistance data IE of the paging message.

In embodiments of the present disclosure, various IEs may be carried in the paging message to indicate various parameters in the paging message. In embodiments of the present disclosure, the paging cause may be carried as a separate IE in an IE list of the paging message. That is, an IE is newly added in an original paging message to carry the paging cause.

In addition, the IE list of the paging message may contain an assistance data IE. The paging cause is carried in the assistance data IE. In case of maintaining the original information format of the paging message, reserved bits of the assistance data IE are used to carry the paging cause, which is compatible with the related art, and does not need to change the message form of the paging message.

In an embodiment, meaning of a parameter corresponding to each IE in the IE list may be specified through a predetermined protocol, so as to define various paging causes.

In some embodiments, the method for processing the paging message further includes receiving the paging cause from a core network.

The paging cause may be sent by an access and mobility management function (AMF) of the core network.

In one embodiment, the AMF sends the paging cause through the paging message. For example, when the AMF sends the paging message carrying system information change notifications or disaster notifications such as earthquakes and tsunami to terminals in all states, the paging cause may be carried incidentally. For example, when the AMF sends the paging message to the UEs in the RRC idle state (IDLE) or the inactive state (INACTIVE), the paging cause may be sent through the paging message.

In some embodiments, the paging cause is not necessarily carried in the paging message, and may be sent by the core network element, such as AMF through other messages different from the paging message, such as a core network message that is sent specially with the paging cause.

Specifically, the paging cause may be obtained directly through the core network. That is, the core network may directly send the paging cause to the base station, so that the base station may add the paging cause to the IE list of the paging message. The paging cause may be obtained by the service type corresponding to transmission data provided by the core network. For example, the core network provides transmission data of a specific service application scenario to the base station, and the base station determines the paging cause corresponding to the service scenario according to data type or data content of the transmission data.

For example, the transmission data provided by the core network is call service request data. Based on the transmission data, the base station determines that the paging cause is a call request. The base station makes the paging cause carried in the paging message, and sends the paging message to the UE.

In some embodiments, the paging message is sent based on a paging signaling of the core network.

Figure 3:
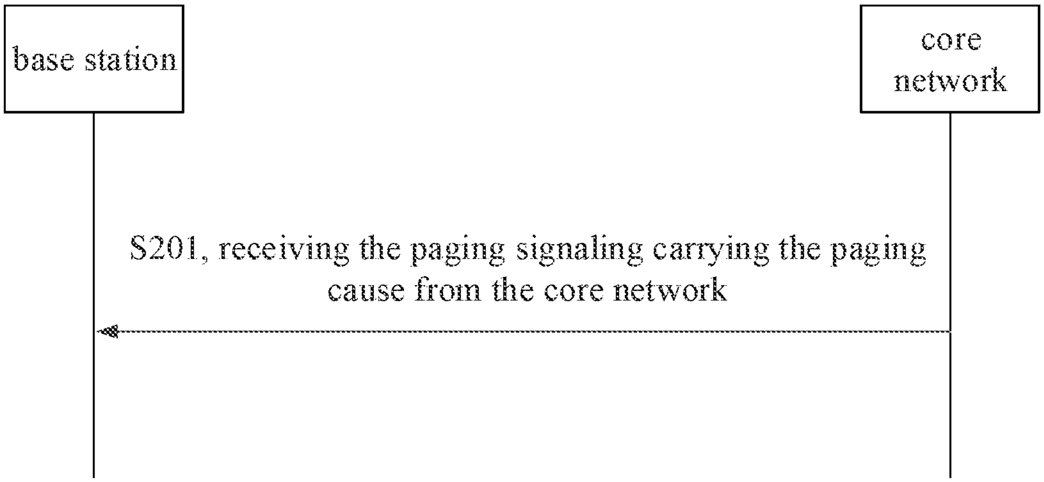
FIG. 3 is a flow chart illustrating a method for processing a paging message according to an embodiment.

As shown in FIG. 3, receiving the paging cause from the core network includes operation in block S201.

In block S201, the paging signaling carrying the paging cause is received from the core network.

In embodiments of the present disclosure, the core network may directly make the paging cause carried in the paging signaling, and the AMF of the core network may send the corresponding paging signaling to the base station (e.g., gNB).

The paging signaling is sent by the AMF for paging the UE in one or more tracking areas. The contents of the message may be represented by the IF, list in the following Table 1,

TABLE 1

| IE/Group Name | Presence | Paging Range | IE Type and Reference | Semantics Description | Criticality | Assigned Criticality |
|---|---|---|---|---|---|---|
| Message Type | Mandatory | | 9.3.1.1 | | YES | Ignore |
| UE Paging Identity | Mandatory | | 9.3.3.18 | | YES | Ignore |

TABLE 1-continued

| IE/Group Name | Presence | Paging Range | IE Type and Reference | Semantics Description | Criticality | Assigned Criticality |
|---|---|---|---|---|---|---|
| Paging in Discontinuous Reception Mode (DRX) | Optional | | 9.3.1.90 | | YES | Ignore |
| Tracking Area Identity (TAI) List for paging | | 1 | | | YES | Ignore |
| >TAI List for Paging Item | | 1 . . . <max noof TAI for Paging> | | | — | |
| >>TAI | Mandatory | | 9.3.3.11 | | — | |
| Paging Priority | Optional | | 9.3.1.78 | | YES | Ignore |
| UE Radio Capability for Paging | Optional | | 9.3.1.68 | | YES | Ignore |
| Paging Origin | Optional | | 9.3.3.22 | | YES | Ignore |
| Assistance Data for Paging | Optional | | 9.3.1.69 | | YES | Ignore |
| Paging Cause | Optional | | x.x.x.x | | YES | Ignore |

In embodiments of the present disclosure, the paging cause is contained in the paging cause IE carried in the paging message received by the base station. Those skilled in the art know that the form of the paging cause IE mentioned in the above table is only an example, which shall not construed to limit the present disclosure.

In addition, the contents shown in Table 1 do not constitute a limitation on the form of the paging signaling. In practical applications, the paging signaling may include some or all of the IEs in the table, and may further include IEs not shown in Table 1.

In some embodiments of the present disclosure, the format of the information element of the paging cause IE or the position of the information element of the paging cause IE may be flexibly adjusted according to the protocol. It should be noted that any paging message carrying a paging cause belongs to the protection scope of the present disclosure.

In some embodiments, the paging message is a radio access network (RAN) paging message.

In embodiments of the present disclosure, the above-mentioned paging message may be the RAN paging message, which is transmitted between NG-RAN nodes, such as, transmitted from NG-RAN node1 to NG-RAN node2 to page the UE.

The contents of the message may be represented by the IE list shown in Table 2.

TABLE 2

| IE/Group Name | Presence | Paging Range | IE Type and Reference | Semantics Description | Criticality | Assigned Criticality |
|---|---|---|---|---|---|---|
| Message Type | Mandatory | | 9.2.3.1 | | YES | Reject |
| CHOICE UE Identity Index Value | Mandatory | | | | YES | Reject |
| >Length-10 | | | | | | |
| >>Index Length-10 | Mandatory | | BIT STRING (SIZE(10)) | Encoding according to TS 38.304 [33] and TS 36.304 [34] | — | |
| UE RAN Paging Identity | Mandatory | | 9.2.3.43 | | YES | Ignore |
| Paging DRX | Mandatory | | 9.2.3.66 | | YES | Ignore |
| RAN Paging Area | Mandatory | | 9.2.3.38 | | YES | Reject |
| Paging Priority | Optional | | 9.2.3.44 | | YES | Ignore |
| Assistance Data for RAN Paging | Optional | | 9.2.3.41 | | YES | Ignore |
| UE Radio Capability for Paging | Optional | | 9.2.3.91 | | YES | Ignore |
| Paging Cause | Optional | | x.x.x.x | | YES | Ignore |

It is noted that the form of the paging cause IE in Table 2 is only an example, which shall not construed to limit the present disclosure. In some embodiments of the present disclosure, the format of the information element of the paging cause IE or the position of the information element of the paging cause IE may be flexibly adjusted according to the protocol. It should be noted that any paging message carrying the paging cause belongs to the protection scope of the present disclosure.

In addition, the contents shown in Table 2 does not constitute a limitation on the format of the RAN paging message. In practical applications, the RAN paging message may include some or all of the IEs in the table, and may further include IEs not shown in Table 2.

In some embodiments of the present disclosure, the format of the information element of the paging cause IE or the position of the information element of the paging cause IE may be flexibly adjusted according to the protocol. It should be noted that any paging message carrying the paging cause belongs to the protection scope of the present disclosure.

In some embodiments, the method for processing the paging message further includes: receiving data to be transmitted to the UE and indication information associated with the data to be transmitted that are sent by the core network; and determining the paging cause for paging the UE according to the indication information.

In embodiments of the present disclosure, in addition to receiving the paging signaling sent by the core network, the base station may directly determine the paging cause by receiving data to be transmitted sent by a user plane function (UPF) of the core network. For example, for the UEs in the RRC inactive state or idle state other than the connected state, after the access network receives the data to be transmitted by the core network to the UE in the RRC inactive state, the access network first determines the paging cause according to the data to be transmitted, and sends the RAN paging message carrying the paging cause. In addition, the access network sends the paging message, and sends the data to be transmitted sent by the UPF to the UE through the RRC connection established with the UE after the UE switches to the RRC connection state in response to the paging message.

The data to be transmitted is associated with the indication information, which indicates the paging cause for paging the UE. The base station may determine the paging cause for paging the UE in the inactive state according to the indication information, and add the paging cause into the paging message to be sent to the UE to inform the UE.

For example, the indication information may include a QoS identifier. Generally, the QoS identifier is related to a transmission delay and/or a transmission accuracy rate of the data to be transmitted. If a tolerable transmission delay corresponding to the QoS identifier is small, it means that the service may be a specific service, and the message is required to be sent downwards to the UE as soon as possible, so that a probability that the UE responds to paging as soon as possible is high. In this way, the QoS identifier may be used to determine the paging cause.

For another example, the indication information may be an identifier associated with the service type of the data to be transmitted, and the base station may determine the service type of the data to be transmitted according to the indication information, and determine the corresponding paging cause. The indication information may be an identifier corresponding to the paging cause determined based on a predetermined protocol, which directly indicates the paging cause corresponding to the data to be transmitted by the base station, so as to facilitate the base station to add the paging cause to the paging message.

It is noted that the method for processing the paging message involved in the embodiments of the present disclosure is applicable to the UE in any other state in addition to the inactive state and the idle state.

In some embodiments, the indication information includes a service identifier of the data to be transmitted.

Here, the indication information includes the service identifier of the data to be transmitted. That is, the data to be transmitted of different services or service types correspond to different indication information. Therefore, the base station may determine the service or service type corresponding to the data to be transmitted according to the indication information, and add the corresponding paging cause into the paging message according to the indication information to page the UE. In this way, even if the data to be transmitted received by the base station does not carry the paging cause, the base station may identify the service identifier to determine the corresponding paging cause and notify the paging cause to the UE. In this way, the UE may determine whether to respond to the paging message or to receive the above-mentioned data according to the paging cause carried in the paging message before the UE receives the data.

Figure 4:
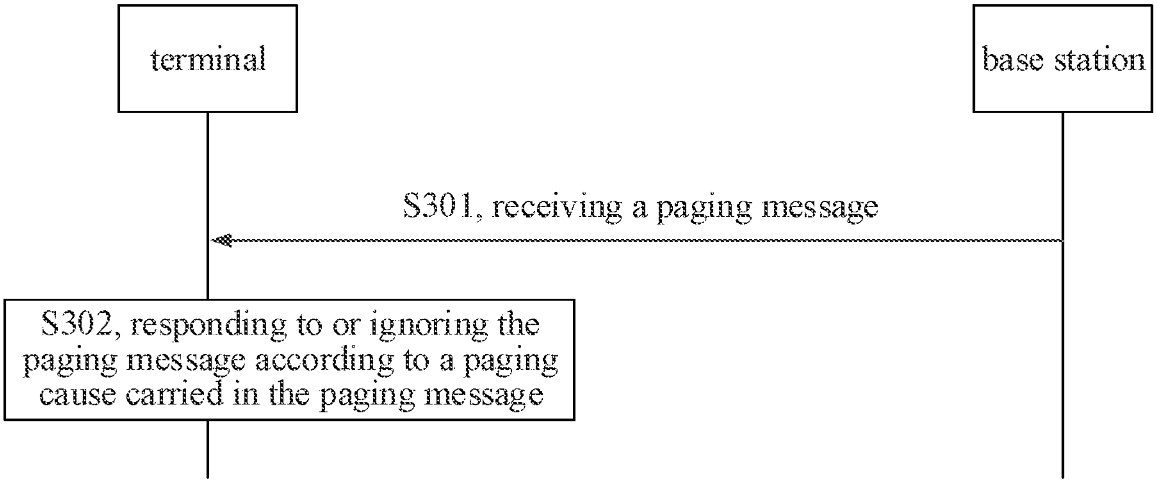
FIG. 4 is a flow chart illustrating a method for processing a paging message according to an embodiment.

As shown in FIG. 4, the present disclosure provides a method for processing a paging message. The method is performed by a user equipment (UE) and includes operations in blocks S301 and S302.

In block S301, a paging message is received.

In block S302, the paging message is responded to or ignored according to the paging cause carried in the paging message.

In embodiments of the present disclosure, the UE receives the paging message with a user identity within a paging range of the base station. Since the paging message carries the paging cause, the paging cause may be read from the paging message, and it is determined to respond to or ignore the paging message according to the paging cause. Here, the UE may be a terminal device such as a mobile phone or a notebook computer.

If the UE determines to respond to the paging message according to the paging cause, a corresponding data connection with the base station is established according to the paging message. At this time, if the UE is in the inactive state, the UE may switch to the RRC connection state to obtain the data sent by the base station, or send the data requested by the paging message to the base station. If the UE determines not to respond to the paging message, the UE ignores the paging message and does not establish the corresponding connection with the base station. In this case, if the UE is in the inactive state, the UE may keep in the inactive state without switching to other states.

In some embodiments, responding to or ignoring the paging message according to the paging cause carried in the paging message includes responding to or ignoring the paging message based on the paging cause and a response criterion.

Here, the UE may respond to or ignore the paging message according to the paging cause and the corresponding processing process in a preset response criterion. For different paging causes, the user, the operator or the terminal may set different response criteria for different user identification cards. In this way, when the UE receives the paging message, the UE may process the paging message by finding the corresponding response criterion according to the paging cause.

In practical applications, the user may change the response criterion at any time according to their needs. For example, in a dual-card mobile phone, when a user identification card in a main card slot is used for network data transmission, a user identification card in a secondary, card slot is in an inactive state. The secondary card listens to the paging message, and if the paging cause is a call request, a response to the paging message is required, a terminal hardware such as a radio frequency module is switched to the secondary card to establish a communication connection and access the call request. However, if the paging cause is a notification message from the operator, the paging message is ignored.

In this way, the terminal may flexibly process the paging messages according to user settings, thus reducing unnecessary paging responses and system switching of the terminal, and improving the user experience.

In some embodiments, responding to or ignoring the paging message according to the paging cause and the response criterion includes responding to or ignoring the paging message according to the paging cause and the response criterion in response to a service priority of data to be transmitted that triggers paging of the UE being a preset priority.

In embodiments of the present disclosure, the above-mentioned response criterion may be the service priority of the service corresponding to the paging message. The UE may be set to classify service priorities into a priority corresponding to responding to the paging message and a priority corresponding to ignoring the paging message. In this way, the UE determines whether to respond to the paging message according to whether the service priority of the data to be transmitted belongs to the preset priority of responding to the paging message or the preset priority corresponding to ignoring the paging message.

In some embodiments, the preset priority is a priority configured based on user input; or a priority configured by a network device.

In embodiments of the present disclosure, the above-mentioned preset priority may be determined according to user input, and the user may change the setting of the preset priority at any, time according to actual needs. The preset priority may be determined through the configuration of the network device, and the UE is notified with the preset priority through the configuration information sent by the network device. The network device may be a base station or a core network device.

For the service priority of the data to be transmitted, the network device such as the core network or the base station may identify the corresponding service priority according to the service type of the data to be transmitted, or the corresponding service priority may be determined by the UE itself through the paging cause.

In some embodiments, responding to or ignoring the paging message according to the paging cause and the response criterion includes outputting a service priority of the data to be transmitted that triggers paging of the UE by the paging cause; and responding to or ignoring the paging message based on user feedback on the service priority.

In embodiments of the present disclosure, options for the user setting may be output on the terminal according to the paging cause. The output ways may include images and texts displayed on a terminal display interface, and voice output to provide the setting options of the service priority. After the user selects the service priority corresponding to the paging cause, the terminal responds to or ignores the paging message by determining whether the service priority meets the preset priority.

The service priority corresponding to the data to be transmitted may be output, and the service priority may be determined by the network device and the UE is notified with the service priority. The user may directly select responding to or ignoring the paging message according to the service priority.

In some embodiments, the paging cause is carried in a paging cause IE or an assistance data IE of the paging message.

In embodiments of the present disclosure, the paging cause may be carried as a separate IE in an IE list of the paging message. In addition, the IE list of the paging message may contain an assistance data IE. The assistance data IE has a corresponding sublist as an IE list of the assistance data IE. Therefore, the paging cause IE may be carried in the IE list as an IE in the sublist of the assistance data IF.

Figure 5:
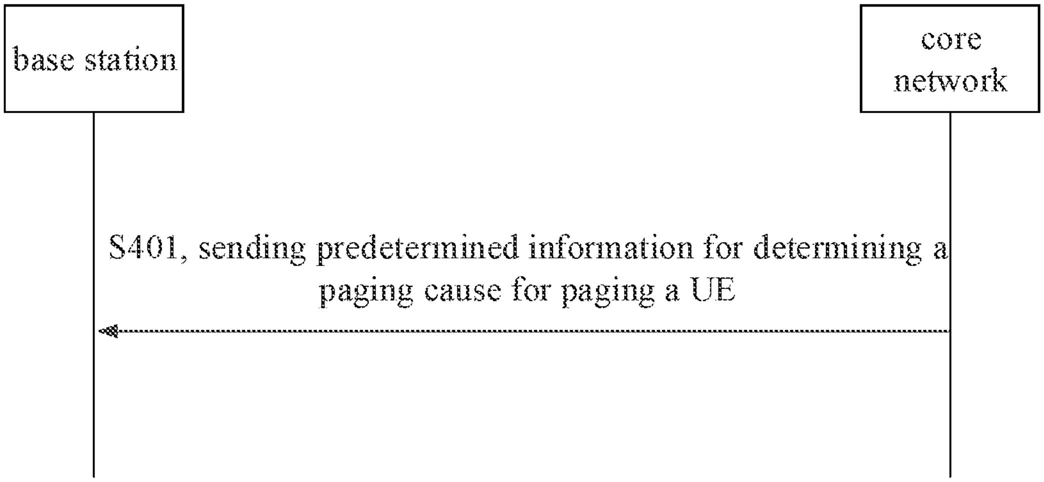
FIG. 5 is a flow chart illustrating a method for processing a paging message according to an embodiment.

As shown in FIG. 5, the present disclosure provides a method for processing a paging message. The method is performed by a core network device and includes operation in block S401.

In block S401, predetermined information for determining a paging cause for paging a UE is sent. The paging cause is carried in a paging message and configured to allow the UE to determine to respond to or ignore the paging message.

Here, the core network may use an AMF or a UPF to send the above-mentioned predetermined information to the base station. After the predetermined message is processed by the base station, the paging cause determined may be carried in the paging message, the UE is informed of the paging cause during the paging process of the UE, and the UE responds to or ignores the paging message according to the paging cause.

In some embodiments, the paging cause is carried in a paging cause IE of the paging message or an assistance data IF of the paging message.

In embodiments of the present disclosure, the paging cause may be carried as a separate IE in an IE list of the paging message. In addition, the IE list of the paging message may contain an assistance data IE. The assistance data IE has a corresponding sublist as an IE list of the assistance data IE. Therefore, the paging cause IE may be carried in the IE list as an IF in the sublist of the assistance data IE.

Here, the above-mentioned IE list may be directly provided by the core network to the base station, and the base station makes the IE list carried in the paging message and provides the paging message to the UE. In addition, the core network may directly send the data to be transmitted to the base station without the carried paging cause, and the base station determines the paging cause corresponding to the data to be transmitted, makes it carried in the paging cause IE of the paging message or in the assistance data IF of the paging message, and sends the paging message to the UE.

In some embodiments, the predetermined information includes a paging signaling carrying the paging cause.

In embodiments of the present disclosure, the core network may directly send the paging signaling carrying the paging cause to the base station, and the paging signaling may be sent by the AMF of the core network for paging the UE in one or more tracking areas.

When the core network sends the paging signaling, the core network may directly make the paging cause carried in the IE list, so that after the base station receives the paging signaling, the base station may directly add the paging cause IE in the IE list into the paging message for paring the UE, and send the paging message to the UE.

In some embodiments, the predetermined information includes indication information associated with data to be transmitted to the UE. The indication information is provided for the access network to confirm the paging cause for paging the UE.

In embodiments of the present disclosure, the above-mentioned data to be transmitted may be sent to the base station through the UPF of the core network, and the base station may send the paging message to the UE according to the data to be transmitted. While the core network sends the data to be transmitted, the core network may transmit the predetermined information for indicating the paging cause to the base station, and the base station may add the paging cause into the paging message according to the indication information.

For example, for the UE in the RRC inactive state, after the access network receives, from the core network, the data to be transmitted that needs to be sent to the UE in the RRC inactive state, the access network first determines the paging cause according to the data to be transmitted, sends a RAN paging message carrying the paging cause on each node of the access network, and sends the paging message downwards to the UE. After the UE switches to the RRC connection state in response to the paging message, the data to be transmitted sent by the UPF is sent to the UE through a RRC connection established with the UE.

In this way, when the base station in the access network needs to page the UE in the inactive state or the idle state, the base station may inform the UE of the paging cause determined by the indication information, so that the UE in the inactive state or the idle state may determine whether to respond to the paging message or not.

In some embodiments, the indication information includes a service identifier of the data to be transmitted.

In embodiments of the present disclosure, the above-mentioned indication information may include an identifier for determining the service or the service type of the data to be transmitted, that is, the above-mentioned service identifier. When the access network performs the paging, it is not required to obtain the paging cause from the core network, and the access network may determine the paging cause of the service corresponding to the data to be transmitted according to the service identifier, and add the paging cause into the paging message to notify the UE.

Examples of the present disclosure are provided as follows.

The RRC inactive state (RRC_INACTIVE) is introduced in 3G NR. When the terminal is in the RRC inactive state, a NAS layer is kept in a connected state (that is, the terminal is kept to be connected to the core network), and an air interface connection of the terminal is disconnected. The base station retains context information of the UE, and the terminal is connected to a NG interface of the core network. The terminal may move within an area configured by the base station without notifying the network, so as to save signaling overhead. When the terminal enters the inactive state, the last serving base station stores the context of the terminal and the NG connection with the serving core network, and a AS layer of the terminal stores the corresponding context information including a carrier, an identifier of the inactive state, and a home area. In this way, the base station may page the terminal in the inactive state through a wireless access network paging mechanism within the area configured, and the terminal may quickly resume data transmission based on the context information stored at the terminal side and the base station side, thus realizing low-delay transmission.

When a multi-card terminal communicates with a first system (a communication system corresponding to a user identification card of the terminal), it is required to periodically listen to/detect a second system (a communication system corresponding to another user identification card of the terminal), such as monitoring the paging, measuring and reading system messages, which may affect the performance of the first system and reduce the experience of using the network of the current user identification card. If the second system does not perform these operations, such as, does not monitor/listen to the paging, the service of the second system may not be established.

Therefore, in embodiments of the present disclosure, when the multi-card terminal receives the paging message on the second system, it is required to determine whether to respond to the paging message according to rules configured by the user.

In embodiments of the present disclosure, when the core network sends the paging message or transmits the data to an anchor base station corresponding to the UE in the inactive state, it is required to inform the base station of the paging cause in the paging signaling or in the data. The paging cause may be realized by directly adding the IE for identifying the paging cause into the paging message, as shown in Table 3 below. In addition, the paging cause may be realized by adding the IE for identifying the paging cause into the paging assistance data IE in the paging message.

The paging message is sent by the AMF to the base station (gNB) for paging the UE one or more tracking areas.

TABLE 3

| IE/Group Name | Presence | Paging Range | IE Type and Reference | Semantics Description | Criticality | Assigned Criticality |
|---|---|---|---|---|---|---|
| Message Type | Mandatory | | 9.3.1.1 | | YES | Ignore |
| UE Paging Identity | Mandatory | | 9.3.3.18 | | YES | Ignore |
| Paging DRX | Optional | | 9.3.1.90 | | YES | Ignore |
| TAI List for Paging | | 1 | | | YES | Ignore |
| >TAI List for Paging Item | | 1 . . . <max noof TAI for Paging> | | | — | |
| >>TAI | Mandatory | | 9.3.3.11 | | — | |
| Paging Priority | Optional | | 9.3.1.78 | | YES | Ignore |
| UE Radio Capability for Paging | Optional | | 9.3.1.68 | | YES | Ignore |
| Paging Origin | Optional | | 9.3.3.22 | | YES | Ignore |
| Assistance Data for Paging | Optional | | 9.3.1.69 | | YES | Ignore |
| Paging Cause | Optional | | x.x.x.x | | YES | Ignore |

When the above-mentioned anchor base station receives the above-mentioned paging message carrying the paging cause sent by the core network, or the data to be transmitted sent by the core network, the anchor base station may add the paging cause into a wireless paging signaling. In embodiments of the present disclosure, the paging cause may be realized by directly adding the IE for identifying the paging cause into the RAN paging message, as shown in Table 4 below.

The RAN paging message is transmitted between NG-RAN nodes to page the UE.

TABLE 4

| IE/Group Name | Presence | Paging Range | IE Type and Reference | Semantics Description | Criticality | Assigned Criticality |
|---|---|---|---|---|---|---|
| Message Type | Mandatory | | 9.2.3.1 | | YES | Reject |
| CHOICE UE Identity Index Value | Mandatory | | | | YES | Reject |
| >Length-10 | | | | | | |
| >>Index Length-10 | Mandatory | | BIT STRING (SIZE(10)) | Encoding according to TS 38.304 [33] and TS 36.304 [34] | — | |
| UE RAN Paging Identity | Mandatory | | 9.2.3.43 | | YES | Ignore |
| Paging DRX | Mandatory | | 9.2.3.66 | | YES | Ignore |
| RAN Paging Area | Mandatory | | 9.2.3.38 | | YES | Reject |
| Paging Priority | Optional | | 9.2.3.44 | | YES | Ignore |
| Assistance Data for RAN Paging | Optional | | 9.2.3.41 | | YES | Ignore |
| UE Radio Capability for Paging | Optional | | 9.2.3.91 | | YES | Ignore |
| Paging Cause | Optional | | x.x.x.x | | YES | Ignore |

After the UE in the inactive state or the idle state receives the paging signaling carrying the paging cause, the UE in the inactive state or the idle state determines whether to respond to the paging message according to a predetermined response criterion.

For example, the UE may consider the paging cause and the service priority of the corresponding service to determine whether to respond to the paging message. In addition, the service priority may be configured by the user or pre-configured by network device (including the base station or the core network deice), and the UE is notified with the service priority.

The UE may present the service or the service type corresponding to the paging cause to the user through the UI of the terminal, and the user may determine whether to respond to the paging.

Figure 6:
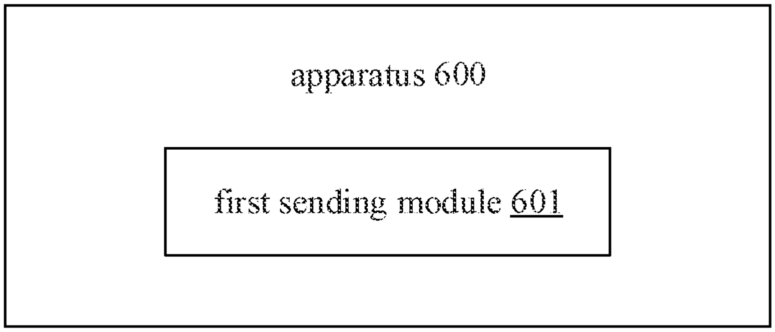
FIG. 6 is a schematic diagram illustrating an apparatus for processing a paging message according to an embodiment.

As shown in FIG. 6, the present disclosure also provides an apparatus 600 for a processing paging message. The apparatus is applied to a base station and includes a first sending module 601.

The first sending module 601 is configured to send a paging message carrying a paging cause. The paging cause is provided for a user equipment (UE) to determine to respond to or ignore she paging message.

In some embodiments, the paging cause is carried in a paging cause IE of the paging message or an assistance data IE of the paging message.

In some embodiments, the apparatus for processing the paging message further includes a first receiving module configured to receive the paging, cause from a core network.

In some embodiments, the paging message is transmitted based on a paging signaling of the core network. The first receiving, module includes a first receiving, submodule configured to receive the paging signaling carrying the paging cause from the core network.

In some embodiments, the paging message is a RAN paging, message.

In some embodiments, the apparatus for processing the paging message further includes a second receiving module configured to receive data to be transmitted to the UE and indication information associated with the data to be transmitted that are sent by the core network; and a determining module configured to determine the paging cause for paging the UE according to the indication information.

In some embodiments, the indication information includes a service identifier of the data to be transmitted.

Figure 7:
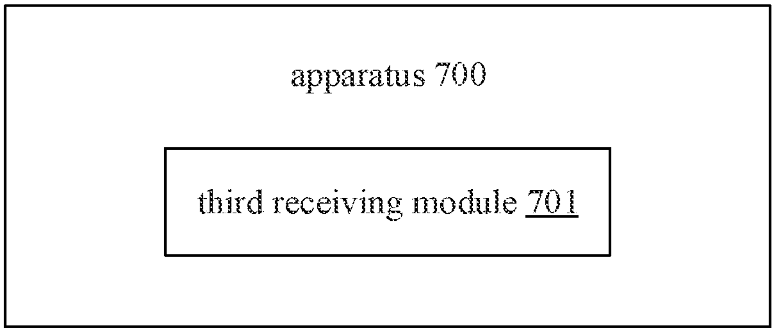
FIG. 7 is a schematic diagram illustrating an apparatus for processing a paging message according to an embodiment.

As shown in FIG. 7, the present disclosure also provides an apparatus 700 for processing a paging message, the apparatus is applied to a user equipment (UE) and includes a third receiving module 701 and a responding module.

The third receiving module 701 is configured to receive a paging message.

The responding module is configured to respond to or ignore the paging message according to a paging cause carried in the paging message.

In some embodiments, the responding module includes a responding submodule configured to respond to or ignore the paging message based on the paging cause and a response criterion.

In some embodiments, the responding submodule includes a first responding unit configured to respond to or ignore the paging message according to the paging cause and the response criterion in response to a service priority of data to be transmitted that triggers paging of the UE being a preset priority.

In some embodiments, the preset priority is a priority configured based on user input; or a priority configured by a network device.

In some embodiments, the responding submodule includes an output unit configured to output a service priority of the data to be transmitted that triggers paging of the UE by the paging cause; and a second responding unit configured to respond to or ignore the paging message based on user feedback on the service priority.

In some embodiments, the paging cause is carried in a paging cause IE or an assistance data IE of the paging message.

Figure 8:
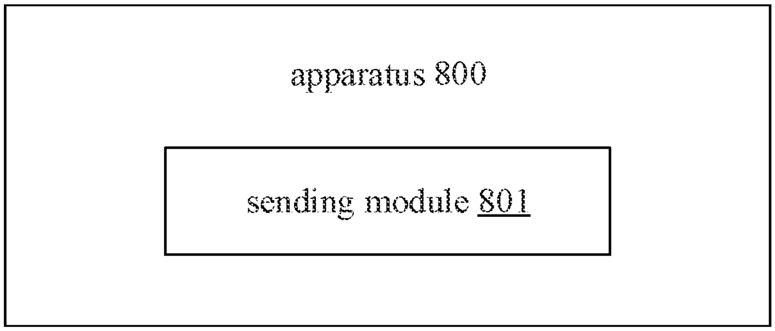
FIG. 8 is a schematic diagram illustrating an apparatus for processing a paging message according to an embodiment.

As shown in FIG. 8, the present disclosure also provides an apparatus 800 for processing a paging message. The apparatus is applied to a core network and includes a sending module 801.

The sending module 801 is configured to send predetermined information for determining a paging cause for paging a UE. The paging cause is carried in a paging message and configured to allow the UE to determine to respond to or ignore the paging message.

In some embodiments, the paging cause is carried in a paging cause IE of the paging message or an assistance data IE of the paging message.

In some embodiments, the predetermined information includes a paging signaling carrying the paging cause.

In some embodiments, the predetermined information includes indication information associated with data to be transmitted to the UE. The indication information is provided for the access network to confirm the paging cause for paging the UE.

In some embodiments, the indication information includes a service identifier of the data to be transmitted.

Regarding the apparatus in the above-mentioned embodiments, the specific manner for executing the operations in each module has been described in detail in the embodiments related to the method, and will not be described in detail here.

Figure 9:
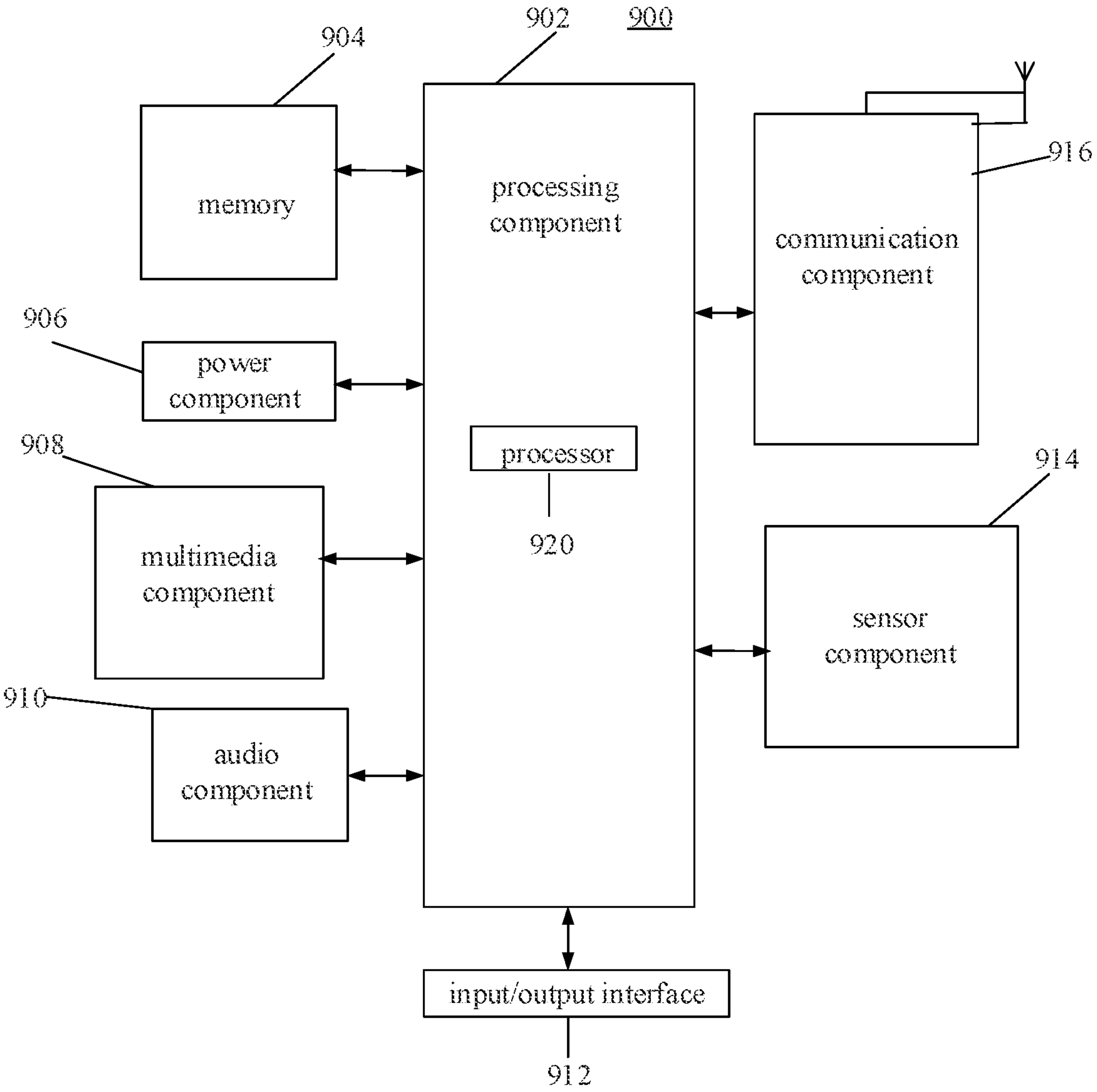
FIG. 9 is a schematic diagram illustrating a communication device according to an embodiment.

FIG. 9 is a block diagram illustrating a communication device according to an embodiment of the present disclosure. The communication device may be a terminal. For example, the communication device 900 may be a mobile phone, a computer, a digital broadcast user equipment, a messaging device, a game console, a tablet device, a medical device, a fitness device, a personal digital assistant, and the like.

Referring to FIG. 9, the communication device 900 may include one or more the following components: a processing component 902, a memory 904, a power component 906, a multimedia component 908, an audio component 910, an input/output (I/O) interface 912, a sensor component 914, and a communication component 916.

The processing component 902 typically controls overall operations of the communication device 900, such as the operations associated with display, telephone calls, data communications, camera operations, and recording operations. The processing component 902 may include one or more processor 920 to execute instructions to perform all or some of the steps of the above-mentioned methods. Moreover, the processing component 902 may include one or more modules to facilitate interaction between the processing component 902 and other components. For example, the processing component 902 may include a multimedia module to facilitate the interaction between the multimedia component 908 and the processing component 902.

The memory 904 is configured to store various types of data to support the operations at the communication device 900. Examples of such data include instructions for any applications or methods operated on the communication device 900, contact data, phonebook data, messages, pictures, videos, and the like. The memory 904 may be implemented by any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read only-memory (ROM), a magnetic memory, a flash memory, a magnetic or an optical disk.

The power component 906 provides power to various components of the communication device 900. The power component 906 may include a power management system, one or more power sources, and any other components associated with generation, management, and distribution of power in communication device 900.

The multimedia component 908 includes a screen providing an output interface between the communication device 900 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and/or the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone (MIC) configured to receive an external audio signal when the communication device 900 is in an operation mode, such as a call mode, a recording mode, and a voice recognition mode. The received audio signals may be further stored in the memory 904 or transmitted via the communication component 916. In some embodiments, the audio component 910 further includes a speaker to output audio signals.

The I/O interface 912 provides an interface between the processing component 902 and peripheral interface modules, such as keyboards, click wheels, buttons, and the like. The buttons may include, but are not limited to, a home button, a volume button, a starting button, and a locking button.

The sensor component 914 includes one or more sensors to provide status assessments of various aspects of the communication device 900. For example, the sensor component 914 may detect an open/closed status of the communication device 900, relative positioning of components, such as the display and the keypad, of the communication device 900, a change in position of the communication device 900 or a component of the communication device 900, a presence or absence of user contact with the communication device 900, an orientation or acceleration/deceleration of the communication device 900, and a change in temperature of the communication device 900. The sensor component 914 may include a proximity sensor configured to detect the presence of nearby objects without any physical contact. The sensor assembly 914 may also include a light sensor, such as a CMOS or CCD image sensor, for use in imaging applications. In some embodiments, the sensor component 914 may also include an acceleration sensor, a gyroscope sensor, a magnetic sensor, a pressure sensor or a temperature sensor.

The communication component 916 is configured to facilitate communication, wired or wireless, between the communication device 900 and other devices. The communication device 900 may access a wireless network based on a communication standards, such as WiFi, 2G, 3G, 4G, 5G, or 6G, or a combination thereof. In one illustrative embodiment, the communication component 916 receives a broadcast signal or broadcast associated information from an external broadcast management system via a broadcast channel. In one illustrative embodiment, the communication component 916 further includes a near field communication (NFC) module to facilitate short-range communication. For example, the NFC module may be implemented based on a radio frequency identification (RFID) technology, an infrared data association (IrDA) technology, an ultra-wideband (UW B) technology, a Bluetooth (BT) technology and other technologies.

In an illustrative embodiment, the communication device 900 may be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors, or other electronic components, for performing the methods described above.

In an illustrative embodiment, there is also provided a non-transitory computer-readable storage medium including instructions, such as included in the memory 904, executable by the processor 920 in the communication device 900, for performing the above-mentioned methods. For example, the non-transitory computer-readable storage medium may be a ROM, a random access memory (RAM), a CD-ROM, a magnetic tape, a floppy disk, an optical data storage device, and the like.

Figure 10:
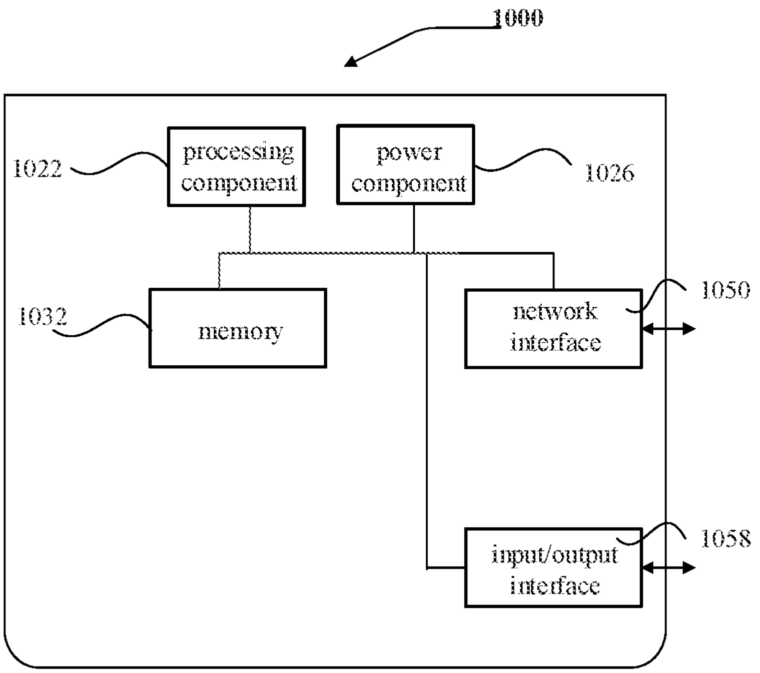
FIG. 10 is a schematic diagram illustrating a communication device according to an embodiment.

As shown in FIG. 10, the present disclosure shows a structure of a communication device. The communication device may be the base station in embodiments of the present disclosure. For example, the communication device 1000 may be provided as a network device. Referring to FIG. 10, the communication device 1000 includes a processing component 1022 (which further includes at least one processor), and a memory resource represented by a memory 1032 for storing instructions executable by the processing component 1022, such as an application program. The application program stored in memory 1032 may include one or more modules each corresponding to a set of instructions. In addition, the processing component 1022 is configured to execute instructions, so as to perform any method of the above-mentioned method applied to the communication device.

The communication device 1000 may also include a power component 1026 configured to perform power management of the communication device 1000, a wired or wireless network interface 1050 configured to connect the communication device 1000 to a network, and an input/output (I/O) interface 1058. The communication device 1000 may be operated based on an operating system stored in the memory 1032, such as Windows Server™, Mac OS X™, Unix™, Linux™, FreeBSD™, or the like.

Other embodiments of the present disclosure will be apparent to those skilled in the art from consideration of the specification and practice of the present disclosure disclosed here. The present disclosure is intended to cover any variations, uses, or adaptations of embodiments of the present disclosure following the general principles thereof and including such departures from embodiments of the present disclosure as come within known or customary practice in the art. In addition, for those skilled in the art, without departing from the principle of the present disclosure, the steps or modules in various embodiments of the present disclosure may also be replaced or combined, and these replacements and combinations could also be regarded as the protection scope of the present disclosure. It is intended that the specification and the examples be considered as illustrative only, with a true scope and spirit of the embodiments of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of embodiments of the present disclosure only be limited by the appended claims.

What is claimed is:

1. A method for processing a paging message, performed by a base station, the method comprising:

generating a paging cause based on data to be transmitted sent by a user plane function (UPF) of a core network, wherein the data to be transmitted is associated with indication information containing a quality of service (QoS) identifier, and the indication information is used to indicate the paging cause for paging a user equipment (UE);

sending a paging message carrying the paging cause, wherein the paging cause and a response criterion corresponding to the paging cause are used for the UE to determine to respond to or ignore the paging message;

wherein the paging cause is a separate information element (IE) carried in at least one of a paging cause IE used to indicate the paging cause of the paging message or carried in reserved bits of an assistance data IE of the paging message;

the paging message is a radio access network (RAN) paging message transmitted between new generation-radio access network (NG-RAN) nodes;

the response criterion is responding to or ignoring the paging message based on a service type of the data to be transmitted, wherein the service type comprises at least one of an incoming call, a short message or a system message.

2. The method according to claim 1, further comprising:

receiving the paging cause from the core network.

3. The method according to claim 2, wherein the paging message is transmitted based on a paging signaling of the core network; and receiving the paging cause from the core network comprises:

receiving the paging signaling carrying the paging cause from the core network.

4. The method according to claim 1, further comprising:

receiving the data to be transmitted to the UE and the indication information associated with the data to be transmitted that are sent by the core network; and determining the paging cause for paging the UE according to the indication information, wherein the indication information comprises a service identifier of the data to be transmitted.

5. A base station, comprising:

a processor; and a memory for storing instructions executable by the processor;

wherein the processor is configured to perform the method according to claim 1.

6. A non-transitory computer-readable storage medium having stored therein computer executable instructions that, when executed by a processor, cause the processor to perform the method according to claim 1.

7. A method for processing a paging message, performed by a user equipment (UE), the method comprising:

receiving a paging message; and responding to or ignoring the paging message according to a paging cause carried in the paging message and a response criterion corresponding to the paging cause;

wherein the paging cause is a separate information element (IE) carried in at least one of a paging cause IE used to indicate the paging cause of the paging message or carried in reserved bits of an assistance data IE of the paging message;

the paging message is a radio access network (RAN) paging message transmitted between new generation-radio access network (NG-RAN) nodes;

the response criterion is responding to or ignoring the paging message based on a service type of data to be transmitted, wherein the service type comprises at least one of an incoming call, a short message or a system message; and the paging cause is generated by a base station based on the data to be transmitted sent by a user plane function (UPF) of a core network, the data to be transmitted is associated with indication information containing a QoS identifier, and the indication information is used to indicate the paging cause for paging the UE.

8. A user equipment (UE), comprising:

a processor; and a memory for storing instructions executable by the processor;

wherein the processor is configured to perform the method according to claim 7.

9. A non-transitory computer-readable storage medium having stored therein computer executable instructions that, when executed by a processor, cause the processor to perform the method according to claim 7.

10. A method for processing a paging message, performed by a core network device, the method comprising:

sending predetermined information for determining a paging cause for paging a user equipment (UE), wherein the paging cause carried in a paging message and a response criterion corresponding to the paging cause are used for the UE to determine to respond to or ignore the paging message;

wherein the paging cause is a separate information element (IE) carried in at least one of a paging cause IE used to indicate the paging cause of the paging message or carried in reserved bits of an assistance data IE of the paging message;

wherein the paging message is a radio access network (RAN) paging message transmitted between new generation-radio access network (NG-RAN) nodes;

the response criterion is responding to or ignoring the paging message based on a service type of data to be transmitted, wherein the service type comprises at least one of an incoming call, a short message or a system message; and the paging cause is generated by a base station based on the data to be transmitted sent by a user plane function (UPF) of a core network, the data to be transmitted is associated with indication information containing a QoS identifier, and the indication information is used to indicate the paging cause for paging the UE.

11. The method according to claim 10, wherein the predetermined information comprises at least one of:

a paging signaling carrying the paging cause; or indication information associated with data to be transmitted to the UE, wherein the indication information is provided for an access network to confirm the paging cause for paging the UE, and the indication information comprises a service identifier of the data to be transmitted.

12. A core network device, comprising:

a processor; and a memory for storing instructions executable by the processor;

wherein the processor is configured to perform the method according to claim 10.

13. A non-transitory computer-readable storage medium having stored therein computer executable instructions that, when executed by a processor, cause the processor to perform the method according to claim 10.

* * * * *